April 10, 1945.  E. G. LURCOTT, JR  2,373,249
RANGE FINDER
Filed April 29, 1942
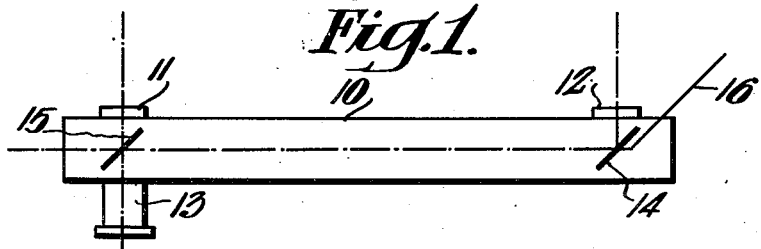
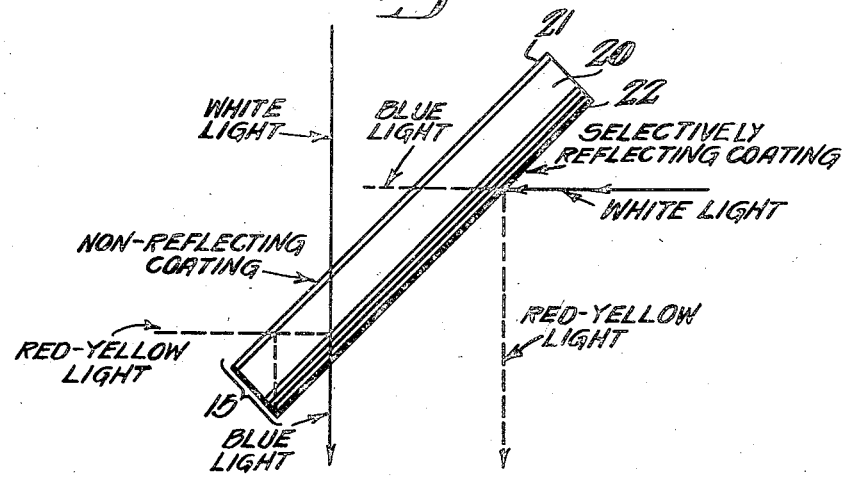
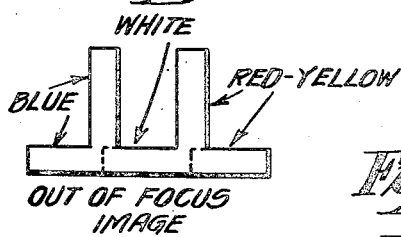
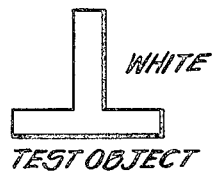
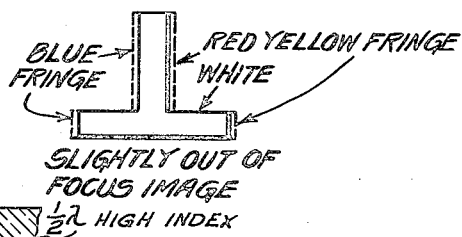
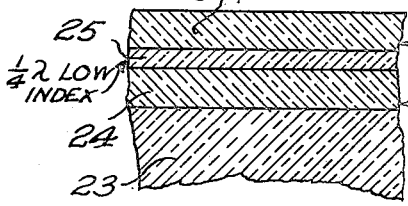
Inventor
Eugene C. Lurcott, Jr.
By
Attorney Patented Apr. 10, 1945

2,373,249

UNITED STATES PATENT OFFICE 2,373,249

RANGE FINDER

Eugene George Lurcott, Jr., Indianapolis, Ind., assignor to Radio Corporation of America, a corporation of Delaware Application April 29, 1942, Serial No. 440,903

4 Claims. (Cl. 88—2.4)

This invention relates to range finders and more particularly to a range finder of the coincidence type in which two images of the object, the distance of which is to be determined, are optically superposed.

In the coincidence type of range finder, the images received through two objects or objective apertures are directed to a single optical axis where they are directed from the instrument through an eye piece. The images are caused to superpose either by moving one of the reflectors or by the use of a pair of relatively rotatable prisms.

In the type of coincidence range finders which are generally applied to photographic work, the images are combined by a slanted semi-transparent, semi-reflecting mirror. This semi-reflector at best usually introduces a light loss of the order of 50%. In many instances, it is desirable to distinguish the images from the right and left hand objective and in order to do this, a color filter is often introduced into one or the other of the optical paths, thereby introducing a further loss of light. The light loss involved in the superposed image coincidence type of range finder has heretofore rendered it practically useless for military purposes where the range finders are required to operate under adverse conditions of illumination. For conditions of adverse illumination, the coincidence type of range finder is usually of the split field type in which the image from the two objectives are caused to form adjacent image portions in the observer's field of view. In some instances, these adjacent portions are similar but reversed and are caused to match in relatively inverted positions and in other instances they may form adjacent positions of the object field which are caused to match. The split field type of range finder has an entirely different disadvantage than the superposition type in that if the object is of a repeated geometrical pattern or has arbitrary geometrical patterns painted or otherwise provided thereon, it becomes extremely difficult to determine when the portions of the field are exactly matched.

The range finder of the present invention is preferably of the superposition type although the invention may be applied to the split field type of instrument and avoid all of the foregoing disadvantages. The light loss of the superposition type instrument is avoided by the use of an improved light combining and dividing device which gives an illumination amounting to substantially 100% of the light selected from either objective. At the same time, the light is divided into different colors so that the object appears in its natural colors only when the images are properly superposed. If the images are widely divergent they appear in contrasting colors. If they are partly superposed, they appear partly in natural colors but with intense color fringes and if they are exactly superposed the image appears in its natural colors free of fringes and with an intensity determined by the aperture of the objectives.

In addition to these advantages over the optical deficiencies of both of the prior art types of range finders, the apparatus has the additional advantage in that it is relatively simple and inexpensive to construct and avoids the use of the complicated combining prisms used in the split field type of range finder.

One of the objects of the invention is to provide an improved range finder. Another object of the invention is to provide a coincidence type of range finder which will give improved illumination. Another object is to provide a range finder which will provide color separation of the several images without light loss. Another object of the invention is to provide a range finder which will provide an image in its true colors only when the apparatus is properly adjusted. Another object of the invention is to provide a range finder which will accurately determine the range of an object independent of any arbitrary geometrical patterns thereon.

Other and incidental objects of the invention will be apparent to those skilled in the art from reading the following specification and an inspection of the accompanying drawing in which:

Figure 1 is a longitudinal section through one form of range finder constructed in accordance with my invention;

Figure 2 is an enlarged view of the light divider used in the range finder of Fig. 1;

Figure 3 is an elevation of a test object;

Figure 4 shows the appearance of a test object of Figure 3 through the range finder when it is seriously out of focus;

Fig. 5 shows the appearance of the test object of Fig. 3 through the range finder when it is slightly out of focus;

Figure 6 is a detail of the light divider of Figure 2.

Referring first to the range finder shown in Fig. 1, the instrument is provided with a body 10 which carries two objects or objective apertures 11 and 12 and an eye piece 13. Within the body 10, there is mounted a movable mirror 14 and a light divider 15. The mirror 14 is provided with some appropriate moving mechanism such, for example, as the arm 16 which may be coupled to the focusing mechanism of a camera or it may be actuated by any other appropriate type of calibrated adjusting mechanism. Light entering through the objective 11 strikes the element 15 which is mounted at an angle of 45 degrees to the optical axis passing through 11 and 13 and is partly reflected and partly transmitted. Likewise light entering through 12 is reflected at 14 to the element 15 where it similarly is partly reflected and partly transmitted.

The operation of the element 15 is now described with reference to Fig. 2. The element 15 has a body portion 20 which is preferably of glass or an equivalent rigid transparent material. The outer face of the body 20 is provided with a reflection reducing coating 21 having a thickness of one-quarter of the wave length of the light to be transmitted and preferably composed of the material applied in the manner described in more detail in Dimmick application, Serial No. 432,836, filed February 28, 1942. The other face of the body portion 20 is provided with a selectively reflecting coating 22 preferably composed of three layers of transparent material as described in detail and claimed in Dimmick application, Serial No. 436,998, filed March 31, 1942, and as more generally described in the article entitled, "An Improved Selective Reflector" appearing in the January 1942 issue of the Journal of the Society of Motion Picture Engineers. This coating 22 has the peculiar property of selectively transmitting one color while reflecting the complementary color without any appreciable light loss in either portion of the beam. In the example illustrated, the coating 22 is so constructed as to transmit blue light and reflect red-yellow light. The white light entering through the objective 11 is accordingly divided when it reaches the coating 22, the red-yellow portion of the incident light being reflected toward the left and the blue portion being transmitted in its original direction. Likewise the white light reflected from the mirror 14 strikes the coating 22 and the blue portion thereof is transmitted toward the left while the complementary red-yellow portion is reflected along the same general direction as the transmitted blue light from the objective 11.

In Figure 6, the optical medium which is indicated at 23, may be of glass or other transparent material. On the surface of the support 23 there is deposited by evaporation a layer 24 of material having a high index of refraction, such as zinc sulphide, having a thickness of one-half of the wave length of the light which is to be selectively transmitted. On this zinc sulphide layer there is deposited a layer 25 of calcium fluoride having a thickness of one-quarter of the wave length of the light to be transmitted. The outer layer 26 has a thickness of one-half of the wave length of the light which is to be selectively transmitted and may consist of zinc sulphide. Instead of calcium fluoride, the layer 25 may consist (1) of an evaporation product of a mixture of 90 per cent calcium fluoride and 10 per cent aluminum oxide, (2) of the mineral Gearksutite which is a natural calcium oxy-fluoride, or (3) of an evaporation product of a eutectic mixture of calcium fluoride and aluminum fluoride containing a small percentage of aluminum oxide.

The coating 21 on the outer surface of the body portion 20 may have a thickness of one-quarter of the wave length of light to be transmitted therethrough and may be composed of the same materials as the layer 25 before referred to.

The red and yellow portion of light from the aperture 11, after being reflected from the coating 22, passes through the coating 21 with substantially negligible reflection and is, therefore, prevented from reaching the eye-piece 13. The same is true of the blue portion of light reflected from the mirror 14 and transmitted through the coating 22. Thus, the possibility of images of the object viewed reaching the eye by secondary reflection is reduced to a minimum.

If the range finder is directed toward a test object having general appearance shown in Fig. 3 and the mirror 14 is so adjusted as to properly focus an object at a considerably greater distance or at a distance of infinity, the image appearing in the eye piece 13 will have the general appearance shown in Fig. 4 while the axis of the several beams will be substantially as generally indicated in Fig. 2. The blue light corresponding to the white object will form an image in the left of the image field while the red-yellow light from the right hand objective will form a red-yellow image in the right portion of the image field, these images appearing white only where they overlap. As the instrument is adjusted to bring the images more nearly into coincidence, the image will take on the appearance shown in Fig. 5 where the image becomes substantially white with a blue fringe along the left edge and a red-yellow fringe along the right edge. When the two images have been brought into exact coincidence, the color fringes will disappear and the image will appear white as shown in Fig. 3.

Although the invention has been described in relation to a camera range finder, it will be apparent to those skilled in the art that the invention may also be applied to other types of range finders and that such other types of range finders adapted to more precise work are within the scope of the claims.

I claim as my invention:

1. In a range finder, the combination of means defining a pair of spaced optical axes, means for directing beams of light entering the apparatus along said spaced axes to a single axis, and means at said single axis including a transparent support having a reflection-reducing coating on one of its surfaces and a light-selective coating on the other of its surfaces for combining said beams, said reflection-reducing coating being of material having a low index of refraction and having a thickness of one-quarter of the wave length of light to be transmitted by said reflection-reducing coating, and said light-selective coating including a layer of material having a low index of refraction and having a thickness of one-quarter of the wave length of light to be selectively transmitted by said coating, said layer being interposed between two layers of material having a high index of refraction and each having a thickness of one-half of the wave length of light to be transmitted thereby.

2. In a range finder, the combination of means defining a pair of spaced optical axes, means for directing beams of light entering the apparatus along said spaced axes to coincide on a single axis, means for measuring the angle between said beams, and means at said single axis including a transparent support having a reflection-reducing coating on one of its surfaces and a light-selective coating on the other of its surfaces for combining said beams, said reflection-reducing coating being of material having a low index of refraction and having a thickness of one-quarter of the wave length of light to be transmitted by said reflection-reducing coating, and said light-selective coating including a layer of material having a low index of refraction and having a thickness of one-quarter of the wave length of light to be selectively transmitted by said coating, said layer being interposed between two layers of material having a high index of refraction and each having a thickness of one-half of the wave length of light to be transmitted thereby.

3. In a range finder, the combination of means defining a pair of spaced optical axes, means for directing beams of light entering the apparatus along said spaced axes to a single axis, means for deflecting the beam along at least one of said spaced axes to coincide with the other beam for measuring said deflection to determine range, and means at said single axis including a transparent support having a reflection-reducing coating on one of its surfaces and a light-selective coating on the other of its surfaces for combining said beams, said reflection-reducing coating being of material having a low index of refraction and having a thickness of one-quarter of the wave length of light to be transmitted by said reflection-reducing coating, and said light-selective coating including a layer of material having a low index of refraction and having a thickness of one-quarter of the wave length of light to be selectively transmitted by said coating, said layer being interposed between two layers of material having a high index of refraction and each having a thickness of one-half of the wave length of light to be transmitted thereby.

4. The combination of means defining a pair of spaced optical axes, means for directing beams of light from said axes to a common axis, and means at said common axis including a transparent support having a reflection-reducing coating on one of its surfaces and a light-selective coating on the other of its surfaces for combining said beams, said reflection-reducing coating being of calcium fluoride-aluminum fluoride and having a thickness of one-quarter of the wave length of light to be transmitted by said reflection-reducing coating, and said light-selective coating comprising a layer of zinc sulphide, having a thickness of one-half of the wave length to be selectively transmitted therethrough, a layer of calcium fluoride-aluminum fluoride having a thickness of one-quarter of said wave length superimposed on said layer of zinc sulphide, and a layer of zinc sulphide having a thickness of one-half of said wave length superimposed on said layer of said calcium fluoride-aluminum fluoride.

EUGENE GEORGE LURCOTT, Jr.